(No Model.)

A. M. DODD.
PROCESS OF PRESERVING EGGS.

No. 452,994. Patented May 26, 1891.

Witnesses.
J. Jessen.
O. E. Van Dorn.

Inventor.
Abial M. Dodd.
By Paul & Merwin Att'ys.

United States Patent Office.

ABIAL MONROE DODD, OF STILLWATER, MINNESOTA.

PROCESS OF PRESERVING EGGS.

SPECIFICATION forming part of Letters Patent No. 452,994, dated May 26, 1891.

Application filed July 17, 1890. Serial No. 359,045. (No model.)

*To all whom it may concern:*

Be it known that I, ABIAL MONROE DODD, of Stillwater, Washington county, Minnesota, have invented certain Improvements in an Improved Process for Packing and Preserving Eggs, of which the following is a specification.

My invention relates to improved methods for preserving eggs in such manner that the eggs when packed may be conveniently handled and transported without danger of breakage; and it consists in embedding the eggs in soft clay, so as to efficiently exclude the outer air, in masses of convenient size for handling, and then drying the "bricks" of clay and protecting them from moisture.

My invention further consists in the process hereinafter more particularly described, and pointed out in the claims.

Figure 1:
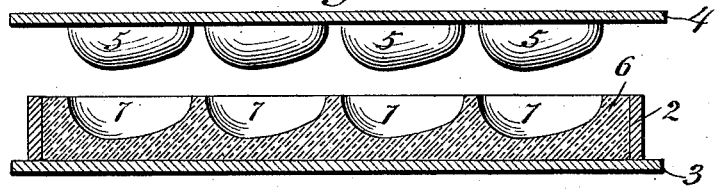
Figure 2:
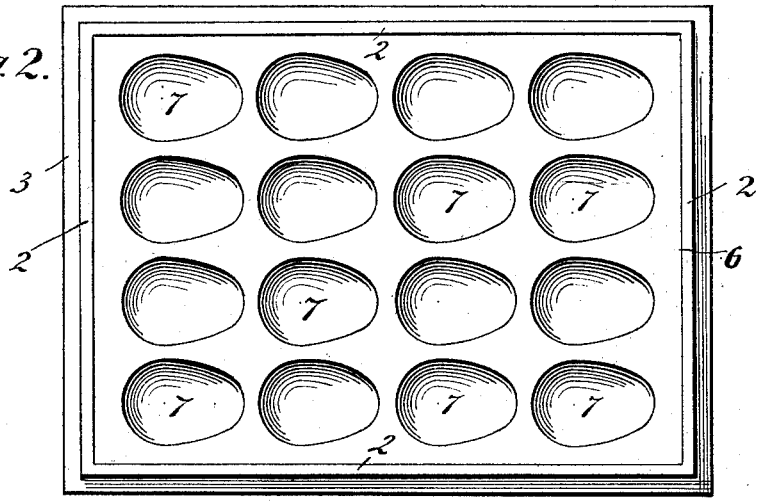
Figure 3:
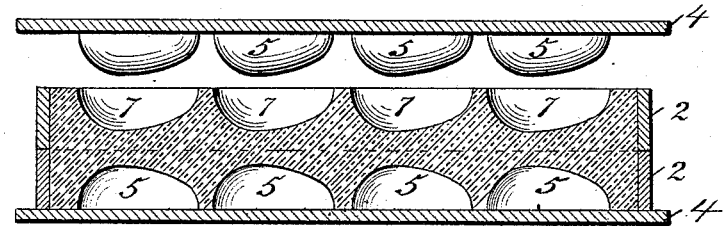
Figure 4:
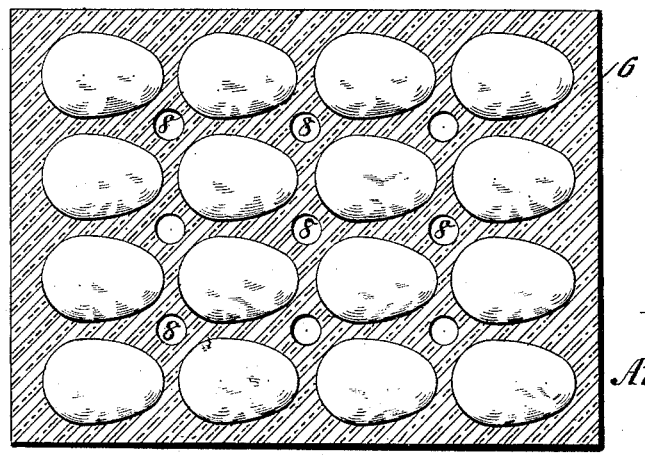

In the accompanying drawings, forming part of this specification, Figure 1 is a sectional side elevation of a section of a brick of clay which has been molded to receive a layer of eggs and the pattern or molding-board slightly raised above the same. Fig. 2 is a plan view of the surface of a section of the clay, which has been stamped or molded to receive a layer of eggs. Fig. 3 is a sectional elevation of a secondary section of clay imprinted on opposite sides by molding-boards which is to be deposited upon the eggs in the first layer, one of the molding-boards being shown slightly raised from the clay; and Fig. 4 is a sectional plan view of a brick filled with eggs, showing the ventilating-perforations through the brick.

In the drawings, 2 represents a rectangular frame or box open at top and bottom to receive one layer of the clay, the frame being placed upon a false bottom 3.

4 is a molding-board or pattern, having rounded projections 5 arranged upon one side in form corresponding to half an egg divided longitudinally. This board is used to stamp or imprint the surface of the mass of clay 6, which is placed in the frame 2 and upon the bottom 3. It will thus be seen that when the molding-board is pressed upon the clay and removed sockets or depressions 7 will be formed in the surface of the clay to receive eggs, one-half contained in the sockets or depressions and one-half extending above.

In Fig. 3 is shown the method for forming or stamping another section of clay to be placed upon the layer of eggs in the first section or layer. In this case a similar frame 2 is placed upon a molding-board 4, which thus serves as a false bottom, and clay being then placed in the frame and pressed down upon the molding-board until the frame is filled, when another molding-board is pressed down upon the surface, the clay contained in the frame thus being stamped or molded on both sides. One of the molding-boards then being removed, the frame, with its contained clay, is inverted upon the first frame in the clay in which eggs have been placed, thus covering and inclosing the eggs in the two sections of clay. This operation is repeated as long as desired by adding successively-stamped sections or layers of clay upon the layers of eggs, the last section being formed in the same manner as the first, after which the frames may be slipped off from the brick, leaving the eggs completely inclosed within the clay and excluded from the outer air. When the brick is completed, I prefer to form openings 8 through the same between the eggs to allow free inlet of air, and thus assist the drying of the clay. The clay is subjected then to a drying process in order to evaporate all of the moisture, after which it may be covered with a water-proof paper or other coating to exclude moisture. In some cases I prefer to mix with the clay of which the bricks are formed chaff or sawdust for the purpose of making the mass lighter, or with straw or other fibrous material to also make the mass more cohesive and less liable to be broken. The bricks are made of uniform size and can be piled up and handled and transported conveniently with very slight danger of injury to the eggs contained. When it is desired to remove the eggs for use, the brick is simply placed in a vessel of water, where it is immediately softened and the eggs freed from it.

While my invention is shown and described as a process for preserving eggs, it may also be used, if desired, for similarly preserving other perishable food products and substances.

I claim—

1. The process of preserving eggs, which consists of stamping or imprinting a mass of soft clay with egg-shaped indentations or sockets, placing eggs in said indentations or sockets, similarly stamping or molding another mass of clay and placing it upon the layer of eggs, so as to inclose the same within the clay, then drying said clay, and giving the same a water-proof covering, substantially as described.

2. The process of packing and preserving eggs, consisting of arranging layers of eggs between successive layers of clay having their adjacent surfaces formed with egg-shaped indentations to receive said layers of eggs, so as to exclude the outer air, making air-openings through the mass of clay, then subjecting the mass to a drying process, and inclosing the same with a water-proof covering.

3. The process of packing and preserving eggs, consisting of arranging layers of eggs between successive layers of clay having their adjacent surfaces formed with egg-shaped indentations, so as to exclude the outer air, and afterward subjecting the mass to a drying process.

4. The process of preserving eggs and similar food products, consisting in arranging a plurality of the same closely together, but not in contact with each other, and filling the interstices between them and entirely inclosing them with soft clay to form a brick or block, and afterward drying the clay.

In testimony whereof I have hereunto set my hand this 23d day of June, 1890.

ABIAL MONROE DODD.

In presence of—
T. D. MERWIN,
A MAE WELCH.